US012522784B2

(12) United States Patent
Xu et al.

(10) Patent No.: US 12,522,784 B2
(45) Date of Patent: Jan. 13, 2026

(54) PACKAGED LAUNDRY DETERGENT PRODUCT

(71) Applicant: The Procter & Gamble Company, Cincinnati, OH (US)

(72) Inventors: Dan Xu, Beijing (CN); Rui Shen, Beijing (CN); Xiaobin Chu, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 377 days.

(21) Appl. No.: 18/361,396

(22) Filed: Jul. 28, 2023

(65) Prior Publication Data

US 2024/0043773 A1 Feb. 8, 2024

(30) Foreign Application Priority Data

Jul. 29, 2022 (WO) ................ PCT/CN2022/108858

(51) Int. Cl.
*C11D 17/00* (2006.01)
*C11D 3/20* (2006.01)
*C11D 17/04* (2006.01)
*C11D 17/06* (2006.01)

(52) U.S. Cl.
CPC .......... *C11D 3/2075* (2013.01); *C11D 17/049* (2013.01); *C11D 17/06* (2013.01); *C11D 2111/12* (2024.01)

(58) Field of Classification Search
CPC ..... C11D 3/2075; C11D 17/049; C11D 17/06; C11D 2111/12; C11D 17/00; C11D 17/041; C11D 17/044
USPC .......................................................... 510/355
See application file for complete search history.

(56) References Cited

U.S. PATENT DOCUMENTS

| | | | | |
|---|---|---|---|---|
| 6,152,600 A * | 11/2000 | Tomic | B65D 33/2541 24/585.12 |
| 2010/0038386 A1 * | 2/2010 | Pritchard | B65D 75/008 222/530 |

FOREIGN PATENT DOCUMENTS

| | | | | |
|---|---|---|---|---|
| CH | 675235 A5 | 9/1990 | |
| CN | 103154230 A * | 6/2013 | C11D 17/0039 |
| CN | 103168098 A * | 6/2013 | C11D 3/046 |
| CN | 103201373 B * | 6/2016 | C11D 17/0039 |
| WO | WO 2012049032 A1 * | 4/2012 | C11D 17/041 |
| WO | WO 2016015326 A1 * | 2/2016 | C11D 1/02 |
| WO | 2019075684 A1 | 4/2019 | |

OTHER PUBLICATIONS

PCT Search Report and Written Opinion for PCT/CN2022/108858 dated Jan. 25, 2023, 10 pages.

* cited by examiner

*Primary Examiner* — Eisa B Elhilo
(74) *Attorney, Agent, or Firm* — Carolyn S. Powell; Gary J. Foose

(57) ABSTRACT

A packaged laundry detergent product including a particulate laundry detergent composition in a flexible package. Such particulate laundry detergent composition includes a plurality of detergent granules that are characterized by a FloDex Value ranging from 10 mm to 20 mm, and each of the detergent granules includes from 5% to 40% of fatty acids and/or salts thereof. The flexible package includes a rigid spout that is characterized by a diameter ranging from 20 mm to 30 mm.

7 Claims, 1 Drawing Sheet

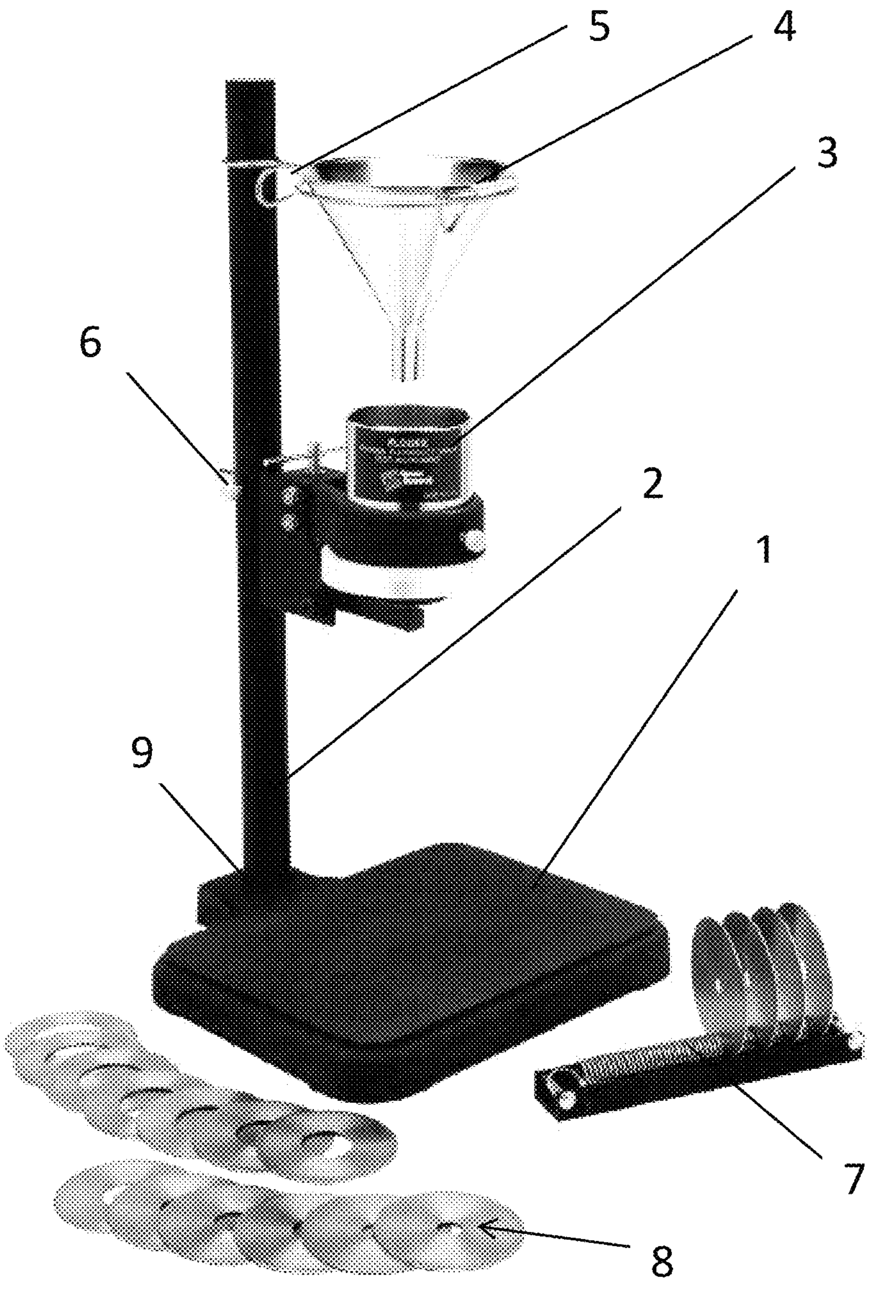
5
4
3
6
2
1
9
7
8

PACKAGED LAUNDRY DETERGENT PRODUCT

FIELD OF THE INVENTION

The present invention relates to packaged laundry detergent products, especially particulate laundry detergent compositions in flexible packages.

BACKGROUND OF THE INVENTION

Particulate laundry detergent products are typically sold in flexible packages made of at least one water-proof or water-resistant flexible film. The flexible film is first folded on itself, followed by sealing the overlapping portions of the film to form a cylinder. Such cylinder is then sealed at its bottom end to form a flexible bag with its top end open. Next, the particulate laundry detergent product is filled into said flexible bag through its open top end, which is then sealed off to form the finished product. When a consumer is ready to use the particulate laundry detergent product, he/she will tear or cut an opening at a top corner of the flexible bag, through which the particulate laundry detergent product can be poured out. After each use, such opening will need to be closed off, e.g., by a clip or a rubber band, to prevent leakage of the particulate laundry detergent product out of the flexible package as well as to prevent moisture/water from getting into the package to cause caking or clumping of the particulate laundry detergent product inside.

However, size and shape of such opening formed by tearing or cutting may vary widely, making it hard to control the amount and speed of particulate laundry detergent product dispensed out of such opening. Further, closure of such opening by clips or rubber bands may still result in accidental leakage, and they may not create effective barriers against moisture/water. Therefore, spouted flexible packages, i.e., flexible packages with rigid spouts located at its top end or an upper corner, have been used more and more in recent years for easy dispensing and better closure of particulate laundry detergent products.

Soap powder, which is a particular type of particulate laundry detergent product that contains a relatively high level of fatty acids or salts thereof (hereinafter "soap"), has become very popular among Chinese consumers in recent years due to its lighter/airier appearance, milder detergency, and easy rinse properties, in comparison with conventional particulate laundry detergent products containing mostly non-soap surfactants. For free-flowing particulate laundry detergent products with good flowability (such as the conventional particulate laundry detergent products), the spouted flexible packages function well. However, the high levels of fatty acids or salts thereof in the soap powder product may alter its surface property and correspondingly limit its flowability. As a result, the spouted flexible packages have not been used to contain soap powder products for fear that it may block the spout opening and cannot be poured out in an easy and controlled manner.

Thus, there is a need for a spouted flexible package that provides easy and controlled dispensing of particulate laundry detergent products with limited flowability, e.g., soap powder products, to form a steady and continuous flow of the particulate laundry detergent composition at a proper flow rate.

SUMMARY OF THE INVENTION

The present invention provides a packaged laundry detergent product comprising a particulate laundry detergent composition in a flexible package, while said particulate laundry detergent composition comprises a plurality of detergent granules that are characterized by a FloDex Value ranging from about 10 mm to about 20 mm, preferably from about 11 mm to about 18 mm, more preferably from about 12 mm to about 16 mm, as measured according to Test 1. Each of said detergent granules comprises from about 5% to about 40%, preferably from about 6% to about 30%, more preferably from about 7% to about 15%, of fatty acids and/or salts thereof. The flexible package comprises a rigid spout that is characterized by a diameter ranging from about mm to about 30 mm, preferably from about 21 mm to about 28 mm, more preferably from about 22 mm to about 26 mm.

Preferably, said plurality of detergent granules are further characterized by: (1) a Median Weight Particle Size (Dw50) ranging from about 250 μm to about 1000 μm, preferably from about 300 μm to about 950 μm, more preferably from about 400 μm to about 850 μm; and (2) a bulk density ranging from about 0.3 g/cm3 to about 0.7 g/cm3, preferably from about 0.35 g/cm3 to about 0.65 g/cm3, more preferably from about 0.4 g/cm3 to about 0.6 g/cm3, as measured by Test 3.

Preferably, said rigid spout is further characterized by a height ranging from about 20 mm to about 50 mm, preferably from about 30 mm to about 40 mm, more preferably from about 32 mm to about 38 mm.

The flexible package may be formed by at least one flexible film; and wherein preferably said flexible package characterized by: (1) a height ranging from about 15 cm to about 80 cm, preferably from about 20 cm to about 60 cm, more preferably from about 30 cm to about 50 cm; and (2) a width ranging from about 12 cm to about 60 cm, preferably from about 15 cm to about cm, more preferably from about 20 cm to about 40 cm.

Preferably, each of said plurality of detergent granules further comprises one or more detersive actives selected from the group consisting of non-soap surfactants, builders, bleach actives, enzymes, polymers, chelants, softeners, suds suppressors, suds boosters, brighteners, dye transfer inhibitors, and any combinations thereof.

Said particulate laundry detergent composition may further comprise a plurality of additive particles that are characterized by a longest dimension ranging from 2 mm to 10 mm, preferably from 3 mm to 9 mm, more preferably from 4 mm to 8 mm; wherein preferably the weight ratio of said additive particles to said detergent granules ranges from 1:20 to 1:100, preferably from 1:25 to 1:75, more preferably from 1:30 to 1:50.

BRIEF DESCRIPTION OF THE DRAWINGS

FIG. 1 is a perspective view of a FLODEX assembly for measuring the Blocking Orifice Diameter (BOD) of detergent granules.

DETAILED DESCRIPTION OF THE INVENTION

Features and benefits of the various embodiments of the present invention will become apparent from the following description, which includes examples of specific embodiments intended to give a broad representation of the invention. Various modifications will be apparent to those skilled in the art from this description and from practice of the invention. The scope of the present invention is not intended to be limited to the particular forms disclosed and the invention covers all modifications, equivalents, and alternatives falling within the spirit and scope of the invention as defined by the claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about mm."

As used herein, terms such as "a" and "an" when used in a claim, are understood to mean one or more of what is claimed or described. The terms "comprise," "comprises," "comprising," "contain," "contains," "containing," "include," "includes" and "including" are all meant to be non-limiting.

The term "particulate laundry detergent composition" refers to a solid powdery or granular laundry detergent composition, preferably a free-flowing powdery or granular laundry detergent composition, such as an all-purpose or heavy-duty washing agent for fabrics, as well as laundry auxiliaries such as bleach actives, rinse aids, additives, or pre-treat products.

The term "flexible", when referring to a flexible package, refers to an easily deformable packaging material that cannot retain a fixed shape or stand on its own at room temperature and atmospheric pressure.

The term "rigid" refers to a material that is not easily deformable and can retain a fixed shape or stand on its own at room temperature and atmospheric pressure.

The term "detergent granule" refers to a particle comprising one or more detersive actives, such as surfactants, builders, bleach actives, enzymes, polymers, chelants, softeners, suds suppressors, suds boosters, brighteners, dye transfer inhibitors, and the like. Preferably, such detergent granules contain a sufficiently high level of fatty acids or salts thereof, e.g., at least 5% and preferably at least 7%. Such detergent granules may further contain one or more non-soap surfactants, such as an anionic surfactant and/or a nonionic surfactant.

The term "additive particle" refers to a particle comprising one or more detersive additives, such as perfumes, enzymes, bleaches, and the like. Preferably, the additive particles are perfume particles containing one or more perfume ingredients, such as free perfumes, pro-perfumes, encapsulated perfumes, perfume microcapsules, and the like. Preferably, such perfume particles contain perfume microcapsules, especially friable perfume microcapsules.

The term "consisting essentially of" means that the composition contains less than about 1%, preferably less than about 0.5%, of ingredients other than those listed.

Further, the term "substantially free of" or "substantially free from" means that the indicated material is present in the amount of from 0 wt % to about 1 wt %, preferably from 0 wt % to about 0.5 wt %, more preferably from 0 wt % to about 0.2 wt %. The term "essentially free of" means that the indicated material is present in the amount of from 0 wt % to about 0.1 wt %, preferably from 0 wt % to about 0.01 wt %, more preferably it is not present at analytically detectable levels.

As used herein, all concentrations and ratios are on a weight basis unless otherwise specified. All temperatures herein are in degrees Celsius (° C.) unless otherwise indicated. All conditions herein are at 20° C. and under the atmospheric pressure, unless otherwise specifically stated. All polymer molecular weights are determined by weight average number molecular weight unless otherwise specifically noted.

Spouted Flexible Package

The flexible package of the present invention is preferably formed by at least one flexible film material having a flexibility factor within the range of 1,000-2,500,000 N/m. Flexible film materials can be configured to have a flexibility factor of 1,000-2,500,000 N/m, or any integer value for flexibility factor from 1,000-2,500,000 N/m, or within any range formed by any of these values, such as 1,000-1,500,000 N/m, 1,500-1,000,000 N/m, 2,500-800,000 N/m, 5,000-700,000 N/m, 10,000-600,000 N/m, 15,000-500,000 N/m, 20,000-400,000 N/m, 25,000-300,000 N/m, N/m, 35,000-100,000 N/m, 40,000-90,000 N/m, or 45,000-85,000 N/m, etc.

The flexible film material may be made from plastic, paper, or a combination thereof. Preferably, the film is made from a plastic selected from the group consisting of polyethylene (PE), polyethylene terephthalate (PET), oriented polypropylene (OPP), biaxially oriented polypropylene (BOPP), and a combination thereof. The PE herein is selected from the group consisting of high density polyethylene (HDPE), medium density polyethylene (MDPE), low density polyethylene (LDPE), linear low density polyethylene (LLDPE), metallocene polyethylene (mPE), biaxially oriented polyethylene (BOPE), and a combination thereof.

The flexible package of the present invention may be made from a multi-layer or a single-layer film, preferably a multi-layer film. Preferably, the multi-layer film comprises an outer layer and an inner layer, more preferably is a two-layer film comprising an outer layer and an inner layer. The inner layer makes contact with the particulate laundry detergent composition contained in the flexible package, whereas the outer layer forms the outermost surface of the flexible package. The outer layer and the inner layer may be independently selected from PE, PET, OPP, or BOPP. More preferably, the two-layer film is a PET/PE film wherein the PET acts as the outer layer, BOPP/PE film wherein the BOPP acts as the outer layer, or PE/PE film, even more preferably the two-layer film is a PE/PE film. In another embodiment, the multi-layer film is a three-layer film, preferably the middle layer of the three-layer film is BOPE. In yet another embodiment, the multi-layer film comprises at least one formed thin layer which comprises bubbles, void volume, or cells.

Part, parts, or all of the flexible film material can be coated or uncoated, treated or untreated, processed or unprocessed, in any manner known in the art. The flexible film materials used to make the packages disclosed herein can be formed in any manner known in the art and can be joined together using any kind of joining or sealing method known in the art, including, for example, heat sealing (e.g., conductive sealing, impulse sealing, ultrasonic sealing, etc.), welding, crimping, bonding, adhering, and the like, and combinations of any of these.

The flexible package may have a top end, an opposing bottom end, and two peripheral walls extending between the top end and the bottom end. A rigid spout is located at or near the top end of the flexible package. Such spout is in communication with the interior volume of the flexible package and is configured to dispense the particulate laundry detergent composition from within the flexible package. Preferably, the spout is positioned at a corner of the top end and one of the peripheral walls of the flexible package, to enable dispensing of the particulate laundry detergent composition at a slanted angle through such corner.

Preferably, the spout is cylindrical or substantially cylindrical, which defines an opening that is either circular or oval in shape. Preferably, the spout has a diameter ranging from about 20 mm to about 30 mm, preferably from about 21 mm to about 28 mm, more preferably from about 22 mm to about 26 mm. The desired volumetric flow rate for dispensing particulate laundry detergent product in general is from about 50 ml/sec to about 100 ml/sec, as measured according to Test 2 hereinafter. It has been discovered that rigid spouts with diameters within the above-mentioned range are particularly suitable for dispensing soap powder products of limited flowability. If the spout diameter is below 20 mm, e.g., around 15 mm, the volumetric flow rate for dispensing soap power is only about 25 ml/sec, which is too slow and may lead to under-dosing. If the spout diameter is above 30 mm, e.g., around 33 mm, the volumetric flow rate for dispensing soap power is above 164 ml/sec, which is too fast and may cause over-dosing. The spout may have a height ranging from about 20 mm to about 50 mm, preferably from about 30 mm to about 40 mm, more preferably from about 32 mm to about 38 mm.

The flexible package further comprises a cap that is removably engaged to the rigid spout, e.g., via inner threads that engage with corresponding outer threads on such rigid spout, to close the spout opening and prevent inadvertent leakage of the particulate laundry detergent product. The flexible package of the present invention may further comprise a rigid shoulder that flanks the base of the spout on both sides. Such a rigid shoulder may help to provide structural support near the base of the spout and enable unobstructed dispensing of the particulate laundry detergent composition.

The spout, cap, and shoulder as mentioned hereinabove are relatively rigid structures (in comparison with the flexible film that forms the flexible package itself) and can be made of any suitable rigid material, such as glass, metal, polymer, and the like, but preferably is made of polymer. In particular, the spout, cap, and shoulder can be made of the same or different materials. Preferably, each of them is independently made of a polymeric material selected from the group consisting of polypropylene (PP), polyethylene (PE), polycarbonate (PC), polyamides (PA) polyethylene terephthalate (PET), polyvinylchloride (PVC), polystyrene (PS), and a combination thereof.

The flexible package of the present invention may further comprise one or more handles located at or near the top end or along a peripheral wall of such package. Such handles can be through handles (i.e., a completely open space through which fingers and/or thumb can be inserted) that are formed by sealing one or more sections of the flexible package and then cut/puncture through such sealed sections.

Detergent Granules

The particulate laundry detergent composition of the present invention comprises a plurality of detergent granules, e.g., in an amount ranging from about 50% to about 99.9%, preferably from about 55% to about 99.5%, more preferably from about 60% to 99%, by total weight of such particulate laundry detergent composition.

The detergent granules of the present invention comprises from about 5% to about 40%, preferably from about 6% to about 30%, preferably from about 7% to about 15%, of fatty acids and/or salts thereof.

Suitable fatty acids or salts that can be used in the present invention include one or more $C_{10}$-$C_{22}$ fatty acids or alkali salts thereof. Such alkali salts include monovalent or divalent alkali metal salts like sodium, potassium, lithium and/or magnesium salts as well as the ammonium and/or alkylammonium salts of fatty acids, preferably the sodium salt. Preferred fatty acids or salts thereof for use herein contain from 10 to 20 carbon atoms, and more preferably 12 to 18 carbon atoms. In a particularly preferred embodiment of the present invention, the cleaning composition of the present invention contains from about 2.5 wt % to about 4 wt % of fatty acids or salts having from about 10 to about 20 carbon atoms, more preferably from about 12 to about 18 carbon atoms.

Exemplary fatty acids that can be used may be selected from caprylic acid, capric acid, lauric acid, myristic acid, myristoleic acid, palmitic acid, palmitoleic acid, sapienic acid, stearic acid, oleic acid, elaidic acid, vaccenic acid, linoleic acid, linoelaidic acid, a-linoelaidic acid, arachidic acid, arachidonic acid, eicosapentaenoic acid, behenic acid, erucic acid, and docosahexaenoic acid, and mixtures thereof.

Saturated fatty acids, such as caprylic acid, capric acid, lauric acid, myristic acid, palmitic acid, stearic acid, arachidic acid, behenic acid, and mixtures thereof, are preferred, but not necessary, for the practice of the present invention. Among these saturated fatty acids, lauric acid, myristic acid and palmitic acid are particularly preferred.

The detergent granules of the present invention are characterized by a FloDex Value ranging from about 10 mm to about 20 mm, preferably from about 11 mm to about 18 mm, more preferably from about 12 mm to about 16 mm, as measured according to Test 1 hereinafter. The FloDex Value is an inverse indicator of the flowability of a particulate material, i.e., the higher the FloDex Value, the lower the flowability. Due to its relatively high content of fatty acids or salts thereof, the detergent granules of the present invention (i.e., soap powder) are characterized by a relatively limited flowability.

The detergent granules of the present invention may further comprise one or more non-soap surfactants, such as anionic surfactants, non-ionic surfactants, zwitterionic surfactants, and/or cationic surfactants. Preferably, such detergent granules may contain from about 10 wt % to about wt %, preferably from about 12 wt % to about 80 wt %, more preferably from about 15 wt % to about 50 wt %, of a total surfactant content (including the fatty acids or salts thereof). Preferably, the detergent granules of the present invention further comprise an anionic surfactant and/or a nonionic surfactant, in addition to the fatty acid or salts thereof.

In addition, the detergent granules may comprise other detersive actives, such as builders, bleach actives, enzymes, polymers, chelants, softeners, suds suppressors, suds boosters, brighteners, dye transfer inhibitors, and the like. The detergent granules can be spray-dried particles and/or agglomerated particles and/or extruded particles.

The detergent granules may be characterized by a Median Weight Particle Size (Dw50) of from about 250 μm to about 1000 μm, preferably from about 300 μm to about 950 μm, more preferably from about 400 μm to about 850 μm. The detergent granules may further be characterized by a bulk density ranging from about 0.3 g/cm3 to about 0.7 g/cm3, preferably from about 0.35 g/cm3 to about 0.65 g/cm3, more preferably from about 0.4 g/cm3 to about 0.6 g/cm3, as measured by Test 3.

Additive Particles

The particulate laundry detergent composition of the present invention may further comprise a plurality of additive particles, e.g., particles containing additional detersive additives such as perfumes, enzymes, bleaches, and the like.

Preferably, such additive particles are characterized by a longest dimension ranging from 2 mm to 10 mm, preferably from 3 mm to 9 mm, more preferably from 4 mm to 8 mm, and they are provided in an amount so that the weight ratio of said additive particles to the above-described detergent granules ranges from 1:20 to 1:100, preferably from 1:25 to 1:75, more preferably from 1:30 to 1:50. The additive particles can also be characterized by an aspect ratio of no more than about 5, e.g., from about 1 to about 5, preferably from about 1.5 to about 4, more preferably from about 2 to about 4.

The above-described spout diameter of the flexible package of the present invention is particularly suitable for dispensing particulate laundry detergent compositions also containing such additive particles in addition to the detergent granules.

Preferably, the additive particles are in form of tablets, pills, spheres, and the like. They can have any shape selected from the group consisting of spherical, hemispherical, compressed hemispherical, cylindrical, disc, circular, lentil-shaped, oblong, cubical, rectangular, star-shaped, flower-shaped, and any combinations thereof. Lentil-shaped refers to the shape of a lentil bean. Compressed hemispherical refers to a shape corresponding to a hemisphere that is at least partially flattened such that the curvature of the curved surface is less, on average, than the curvature of a hemisphere having the same radius. A compressed hemispherical particle can have an aspect ratio (i.e., the ratio of its base diameter over its height that is orthogonal to the base) of from about 2.0 to about 5, alternatively from about 2.1 to about 4.5, alternatively from about 2.2 to about 4. Oblong-shaped particle refers to a particle having a maximum dimension and a secondary dimension orthogonal to the maximum dimension, wherein the ratio of maximum dimension to the secondary dimension is greater than about 1.2, preferably greater than about 1.5, more preferably greater than about 2.

In a preferred but not necessary embodiment of the present invention, the additive particles are perfume particles, which may comprise from about 0.1 wt % to about 20 wt %, preferably from about 0.5 wt % to about 15 wt %, more preferably from about 1 wt % to about 10 wt % of one or more perfume ingredients, such as free perfumes, pro-perfumes, encapsulated perfumes, perfume microcapsules, and the like. The perfume particles may comprise free perfumes, encapsulated perfumes, and/or perfume microcapsules. In one embodiment, the perfume particles comprise free perfumes and are substantially or essentially free of encapsulated perfumes or perfume microcapsules. In yet another embodiment, the perfume particles comprise encapsulated perfumes (i.e., perfumes carried by a carrier material such as starch, cyclodextrin, silica, zeolites or clay) or perfume microcapsules, but are substantially or essentially free of free perfumes. In yet another embodiment, the perfume particles comprises both free perfumes and encapsulated perfumes or perfume microcapsules, e.g., at a weight ratio ranging from about 1:5 to about 5:1, alternatively from about 1:4 to about 4:1, further alternatively from about 1:3 to about 3:1.

Preferably, such perfume particles contain perfume microcapsules (PMCs), especially friable PMCs. For purpose of the present invention, the term "perfume microcapsules" or PMCs cover both perfume microcapsules and perfume nanoparticles. In one embodiment, the PMCs comprise melamine/formaldehyde shells, which are commercially available from Appleton, Quest International, International Flavor & Fragrances, or other suitable sources. In a preferred embodiment, the shells of the PMCs are coated with polymer to enhance the ability of the PMCs to adhere to fabric. The perfume particles of the present invention may comprise from about 0.1 wt % to about 20 wt %, preferably from about 1 wt % to about 18 wt %, more preferably from about wt % to about 15 wt % of perfume microcapsules.

The perfume particles of the present invention may further comprise a water-soluble polymer, e.g., polyethylene glycol (PEG). Preferably, each of the perfume particles comprises from about 5 wt % to about 99.9 wt %, preferably from about 10 wt % to about 99 wt %, more preferably from about 30 wt % to about 95 wt % of PEG, and more preferably such PEG is characterized by a weight average molecular weight (Mw) ranging from about 2,000 to about Daltons, preferably from about 3,000 to about 18,000 Daltons, more preferably from about 4,000 to about 16,000 Daltons. A particular suitable PEG is commercially available from BASF under the tradename PLURIOL E 8000.

Particulate Laundry Detergent Composition

In addition to the detergent granules and additive particles described hereinabove, the particulate laundry detergent composition of the present invention may comprise one or more detergent ingredients. Suitable detergent ingredients include: detersive surfactants including anionic detersive surfactants, non-ionic detersive surfactants, cationic detersive surfactants, zwitterionic detersive surfactants, amphoteric detersive surfactants, and any combination thereof; polymers including carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof; builders including zeolites, phosphates, citrate, and any combination thereof; buffers and alkalinity sources including carbonate salts and/or silicate salts; fillers including sulphate salts and bio-filler materials; bleach including bleach activators, sources of available oxygen, pre-formed peracids, bleach catalysts, reducing bleach, and any combination thereof; chelants; photobleach; hueing agents; brighteners; enzymes including proteases, amylases, cellulases, lipases, xylogucanases, pectate lyases, mannanases, bleaching enzymes, cutinases, and any combination thereof; fabric softeners including clay, silicones, quaternary ammonium fabric-softening agents, and any combination thereof; flocculants such as polyethylene oxide; perfume including starch encapsulated perfume accords, perfume microcapsules, perfume loaded zeolites, schif base reaction products of ketone perfume raw materials and polyamines, blooming perfumes, and any combination thereof; aesthetics including soap rings, lamellar aesthetic particles, geltin beads, carbonate and/or sulphate salt speckles, colored clay, and any combination thereof: and any combination thereof.

In a preferred embodiment of the present invention, the particulate laundry detergent composition comprises one or more builders (not including the carbonate as described hereinabove) in the amount ranging from about 1 wt % to about 40 wt %, typically from 2 wt % to wt %, or even from about 5 wt % to about 20 wt %, or from 8 wt to 15 wt % by total weight of such composition. Builders as used herein refers to any ingredients or components that are capable of enhancing or improving the cleaning efficiency of surfactants, e.g., by removing or reducing "free" calcium/magnesium ions in the wash solution to "soften" or reducing hardness of the washing liquor.

It is particularly desirable that such particulate laundry detergent composition has relatively low levels of phosphate builder, zeolite builder, and silicate builder. Preferably, it contains at most wt % by weight of phosphate builder, zeolite builder, and silicate builder in total. More preferably, such particulate laundry detergent composition contains from 0 wt % to about 5 wt % of phosphate builder, from 0 wt % to about 5 wt % of zeolite builder, and from 0 wt % to about 10 wt % of silicate builder, while the total amounts of these builders add up to no more than 10 wt % by total weight of the composition. Still more preferably, the particulate laundry detergent composition contains from 0 wt % to about 2 wt % of phosphate builder, from 0 wt % to about 2 wt % of zeolite builder, and from 0 wt % to about 2 wt % of silicate builder, while the total amounts of these builders add up to no more than 5 wt % by total weight of the composition. Most preferably, the particulate laundry detergent composition contains from 0 wt % to about 1 wt % of phosphate builder, from 0 wt % to about 1 wt % of zeolite builder, and from 0 wt % to about 1 wt % of silicate builder, while the total amounts of these builders add up to no more than 2 wt % by total weight of the composition. The composition may further comprise any other supplemental builder(s), chelant(s), or, in general, any material which will remove calcium ions from solution by, for example, sequestration, complexation, precipitation or ion exchange. In particular, the composition may comprise materials having at a temperature of 25° C. and at a 0.1M ionic strength a calcium binding capacity of at least 50 mg/g and a calcium binding constant log K Ca' of at least 3.50.

The particulate laundry detergent composition of the present invention may contain one or more solid carriers selected from the group consisting of sodium chloride, potassium chloride, sodium sulphate, and potassium sulphate. In a preferred, but not necessary embodiment, such particulate laundry detergent composition includes from about 20 wt % to about 65 wt % of sodium chloride and/or from about 20 wt % to about 65 wt % of sodium sulphate. When the particulate laundry detergent composition is in a concentrated form, the total amount of sodium chloride and/or sodium sulphate in such composition may sum up, for example, to a total amount of from about 0 wt % to about 60 wt %.

Test Methods

Test 1: FloDex Measurement

1. The flowability of detergent granules is measured by using a FLODEX assembly shown in FIG. 1. Specifically, the FLODEX assembly is set up as follows:
   - 1.1. Insert the mounting post (2) into the base (1) while simultaneously inserting the shaft of the cylinder assembly (3) into the mounting post. Do not tighten the screws.
   - 1.2. Gently rotate the mounting post into the base unit until the cylinder assembly is approximately in the centre of the base. Then, tighten the screws (9) in the base.
   - 1.3. Lightly tighten the cap screw (6) holding the cylinder assembly shaft to keep the cylinder assembly centered in place while continuing assembly.
   - 1.4. Push the funnel ring stand (5) over the mounting post and into the approximate position shown. Then loosen the cap screw (6), hold the cylinder assembly shaft, and slide the cylinder assembly in our out until the centre of the cylinder exactly lines up with the bottom of the funnel. Tighten the screw holding the cylinder assembly shaft. Be sure the cylinder is vertically in line with the shaft (2) before tightening the screw.
   - 1.5. Turn the release lever (9) until the lever arm drops. Insert a flow measurement disk (8) of a suitable size with the number side down by first removing the plastic ring retainer (3) inserting the disk and replacing the ring retainer with the disk (8) in place. Following is a table showing standard orifice sizes (inside hole diameters) of the flow measurement disks:

| MM Marking on Disk | INCH; Tol. +/− .003 |
|---|---|
| 4 | .1575 |
| 5 | .1969 |
| 6 | .2362 |
| 7 | .2756 |
| 8 | .3150 |
| 9 | .3543 |
| 10 | .3937 |
| 12 | .4724 |
| 14 | .5512 |
| 16 | .6299 |
| 18 | .7087 |
| 20 | .7874 |
| 22 | .8661 |
| 24 | .9449 |
| 26 | 1.0236 |
| 28 | 1.1023 |
| 30 | 1.1811 |
| 32 | 1.2598 |
| 34 | 1.3386 |

- 1.6. Manually press the closure plate (5) against the disk and turn the lever back to hold. Test by carefully and slowly moving the release lever forward until the closure plate falls without vibration and into a vertical position.
   - 1.7. Move the funnel down until it is 2 cm above the top of the cylinder. It is important that this dimension remain constant for the entire test. If the loading funnel is too high above the cylinder, the powder may not fill with the same untapped bulk density for each successive test.
   - 1.8. A metal bowl or foil should be used to collect the sample. Metal and foil discharge electrostatic potential that builds up between particles of powder. For this reason, the loading funnel is stainless steel.
   - 1.9. Please note that if the powder is not collected on a conductive sheet, it may acquire electrostatic charge from the previous test and if the same sample is re-run it may not pass through the same minimum hole.
   - 1.10. Prepare to start the test with a 20 mm flow disk. In time, as one becomes more familiar with the characteristics of your products, a more suitable orifice size can then be used as a start point.
2. Preparing the Sample
   - 2.1 A representative sample must be used. After sampling, the appropriate sample mass ($M_{sample}$) is determined by measuring the loose fill (repour) bulk density ($p_{bulk}$) and then multiplying the density by the target volume (150 ml).

$$M_{sample}=150\ \text{ml}\times p_{bulk}$$

- 2.2. The mass of the sample is recorded before the start of each test measurement.
3. Loading
   - 3.1. Load the sample carefully. If necessary, the bottom of the funnel may be tapped lightly so that the sample flows into the receptacle cylinder (hopper) without packing. DO NOT tap the funnel enough to disturb the hopper. DO NOT otherwise disturb the hopper.
   - 3.2. The sample should fill the hopper to within about 1 cm of the top of the hopper.
   - 3.3. After loading the sample, allow exactly 30 seconds for the sample to settle in the hopper.

4. Operation
   4.1. Slowly turn the release lever until the closure drops open without vibration.
   4.2. Weigh the mass of the discharged powder in the collection vessel.
   4.3. The test is classed as positive when the open hole at the bottom is visible when looking down from the top. (Do not tap or shake the Flodex instrument during this period of test time).
   4.4. To empty the remaining contents of the hopper, close the orifice and empty the remaining material by inverting the hopper assembly, pouring the contents into a separate container.
   4.5. For positive results (hole visible), repeat with smaller and smaller disk holes until the test is negative and record the orifice size as the Jammed Orifice Size Diameter.

Test 2: Volumetric Flow Rate Measurement

The laundry detergent is filled in a spouted bag, and have a tray ready on the bench to collected the detergent coming out of the bag during dosing. Then, slowly lift the bottom of the bag to 45 deg pouring angle to mimic the detergent granule dosing position; keep the same dosing position and dosing angle for around 10 seconds and record the actual dosing time. The detergent granule is collected in a tray; and after dosing, weigh out the mass of the detergent on the tray. The volumetric flow rate is then calculated using the equation below $$\text{Volumetric flow rate} = \frac{\text{mass of detergent on the tray}}{\text{bulk density of detergent}} \div \text{actual dosing time}$$

Test 3: Bulk Density Test

The granular material bulk density is determined in accordance with Test Method B, Loose-fill Density of Granular Materials, contained in ASTM Standard E727-02, "Standard Test Methods for Determining Bulk Density of Granular Carriers and Granular Pesticides," approved Oct. 10, 2002.

EXAMPLES

Two particulate laundry detergent compositions (Comparative Sample A without a high soap content and Inventive Sample B with a high soap content) are provided. Their formulations and FloDex values (which are measured according to Test 1 hereinabove) are as follows:

TABLE 1

| Ingredients (Wt %) CW BP | Comparative Sample A (w/o Soap) | Inventive Sample B (with Soap) |
|---|---|---|
| CW BP | 72.13% | 0% |
| SPLE BP (soap powder BP) | 0% | 72.28% |
| Orange Speckle | 0% | 0.51% |
| Purple Speckle | 0% | 0.51% |
| Blue Sulfate and salt speckle | 0.40% | 0% |
| Clay pink speckle | 0.30% | 0% |
| Blocky CMC | 0.18% | 0.19% |
| HEDP (Na) | 0% | 0.59% |
| FWA 15 (Brightener) | 0.03% | 0% |
| MCAS | 0.29% | 0% |
| Sodium Carbonate | 2.52% | 3.06% |
| Precipitated Calcium Carbonate | 1.81% | 3.06% |
| Preferenz P2084 (Enzyme) | 0.14% | 0.20% |
| Medley SW 301 T (Enzyme) | 0% | 0.22% |
| TS Clif Base | 0% | 0.63% |
| Top Gongfu FU | 0% | 0.13% |
| Salt | 21.25% | 15.86% |
| Non-ionic (AE09) | 0.80% | 2.55% |
| Sayuri (spray on perfume) | 0.14% | 0.20% |
| Total | 100% | 100% |
| FloDex Value (Jammed Orifice Diameter) | 8 mm | 13 mm |

It is clear from the FloDex values that the Inventive Sample B with a high soap content has poorer flowability in comparison with the Comparative Sample A without such a high soap content.

Next, the volumetric flow rates of the Comparative Sample A and Inventive Sample B through spouts of different diameters are measured according to Test 2, and following are the results:

TABLE 2

| | Volumetric Flow Rate (ml/second) | |
|---|---|---|
| Spout Diameters (mm) | Comparative Sample A (w/o Soap) | Inventive Sample B (with Soap) |
| 15 | 34.3 | 25 |
| 22 | 105 | 70 |
| 26 | 109 | 96 |
| 33 | 156 | 164.1 |

It is evident that for Comparative Sample A without a high soap content, any spout with diameter above 20 mm, e.g., 22 mm, 26 mm, and 33 mm, results in a volumetric flow rate that is above 100 ml/second, which dispenses too fast and potentially results in undesirable over-dosing of the product. For Inventive Sample B with a high soap content, spouts with diameters from 20 mm to 30 mm, e.g., 22 mm and 26 mm, provide a desired volumetric flow rate that is between 50 ml/second and 100 ml/second; however, spouts with diameters below 20 mm (e.g., 15 mm) or above 30 mm (e.g., 33 mm) will result in either too low or too high a volumetric flow rate that may potentially leads to under-dosing or over-dosing of Inventive Sample B.

More importantly, the volumetric flow rates of Comparative Sample A and Inventive Sample B are not linearly correlated with their flowability. Inventive Sample B has a poorer flowability than Comparative Sample A (indicated by a higher FloDex value) and has exhibited lower volumetric flow rates when the spout dimeters are below 30 mm (e.g., 15 mm, 22 mm, and 26 mm), but it exhibits a higher volumetric flow rate than Comparative Sample A when the spout diameter increases to 33 mm.

Therefore, spouts with diameters ranging from 20 mm to 30 mm are surprisingly and unexpectedly suitable for easy and controlled dispensing of particulate laundry detergent products with higher soap contents and comparative lower flowability, to enable formation of a steady and continuous flow of such products at a proper flow rate.

Combinations

A. A packaged laundry detergent product comprising a particulate laundry detergent composition in a flexible package, wherein said particulate laundry detergent composition comprises a plurality of detergent granules that are characterized by a FloDex Value ranging from 10 mm to 20 mm; wherein each of said detergent granules comprises from 5% to 40% of fatty acids and/or salts thereof; and wherein said flexible package comprises a rigid spout that is characterized by a diameter ranging from 20 mm to 30 mm.

B. The packaged laundry detergent product of Paragraph A, wherein the FloDex Value of said plurality of detergent granules ranges from 11 mm to 18 mm, preferably from 12 mm to 16 mm; wherein preferably said plurality of detergent granules are further characterized by: (1) a Median Weight Particle Size (Dw50) ranging from 250 μm to about 1000 μm, preferably from 300 μm to 950 μm, more preferably from 400 μm to 850 μm; and (2) a bulk density ranging from about 0.3 g/cm3 to about 0.7 g/cm3, preferably from about 0.35 g/cm3 to about 0.65 g/cm3, more preferably from about 0.4 g/cm3 to about 0.6 g/cm3.

C. The packaged laundry detergent product of Paragraph A or B, wherein the diameter of said rigid spout ranges from 21 mm to 28 mm, preferably from 22 mm to 26 mm; wherein preferably said rigid spout is further characterized by a height ranging from 20 mm to 50 mm, preferably from 30 mm to 40 mm, more preferably from 32 mm to 38 mm.

D. The packaged laundry detergent product according to any one of Paragraph A-C, wherein said flexible package is formed by at least one flexible film; and wherein preferably said flexible package characterized by: (1) a height ranging from 15 cm to 80 cm, preferably from 20 cm to 60 cm, more preferably from 30 cm to 50 cm; and (2) a width ranging from 12 cm to 60 cm, preferably from 15 cm to 40 cm, more preferably from 20 cm to 40 cm.

E. The packaged laundry detergent product according to any one of Paragraph A-D, wherein each of said plurality of detergent granules comprises from 6% to 30%, preferably from 7% to 15%, of fatty acids and/or salts thereof; wherein preferably each of said plurality of detergent granules further comprises one or more detersive actives selected from the group consisting of non-soap surfactants, builders, bleach actives, enzymes, polymers, chelants, softeners, suds suppressors, suds boosters, brighteners, dye transfer inhibitors, and any combinations thereof.

F. The packaged laundry detergent product according to any one of Paragraph A-E, wherein said particulate laundry detergent composition further comprises a plurality of additive particles that are characterized by a longest dimension ranging from 2 mm to 10 mm, preferably from 3 mm to 9 mm, more preferably from 4 mm to 8 mm; wherein preferably the weight ratio of said additive particles to said detergent granules ranges from 1:20 to 1:100, preferably from 1:25 to 1:75, more preferably from 1:30 to 1:50.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A packaged laundry detergent product comprising a particulate laundry detergent composition in a flexible package, wherein said particulate laundry detergent composition comprises a plurality of detergent granules that are characterized by a FloDex Value ranging from mm to 20 mm; wherein each of said detergent granules comprises from 5% to 40% of fatty acids and/or salts thereof; and wherein said flexible package comprises a rigid spout that is characterized by a diameter ranging from 20 mm to 30 mm.

2. The packaged laundry detergent product of claim 1, wherein the FloDex Value of said plurality of detergent granules ranges from 11 mm to 18 mm.

3. The packaged laundry detergent product of claim 1, wherein the diameter of said rigid spout ranges from 21 mm to 28 mm.

4. The packaged laundry detergent product of claim 1, wherein said flexible package is formed by at least one flexible film.

5. The packaged laundry detergent product of claim 1, wherein each of said plurality of detergent granules comprises from 6% to 30% of fatty acids and/or salts thereof.

6. The packaged laundry detergent product of claim 1, wherein said particulate laundry detergent composition further comprises a plurality of additive particles that are characterized by a longest dimension ranging from 2 mm to 10 mm.

7. The packaged laundry detergent product of claim 1, wherein said plurality of detergent granules are further characterized by: a Median Weight Particle Size (Dw50) ranging from 250 μm to about 1000 μm; and a bulk density ranging from 0.3 g/$cm^3$ to 0.7 g/$cm^3$.

* * * * *